Nov. 11, 1941.  E. J. YVEN  2,262,081
HAIR WAVING APPARATUS AND METHOD OF MAKING AND USING THE SAME
Filed Jan. 27, 1941  4 Sheets—Sheet 1
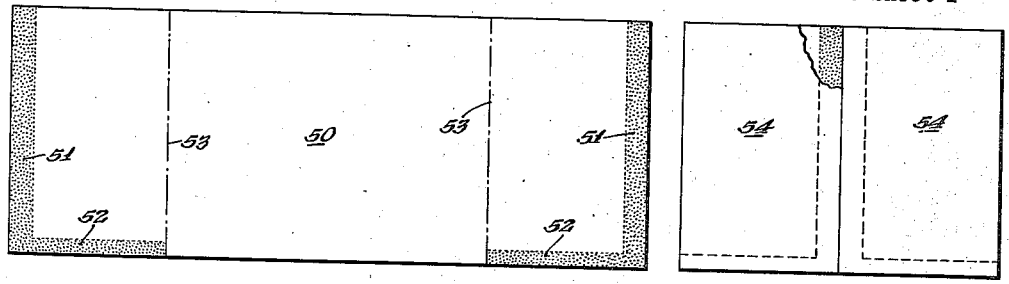
FIG.1.  FIG.2.
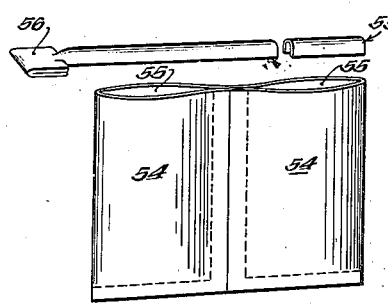 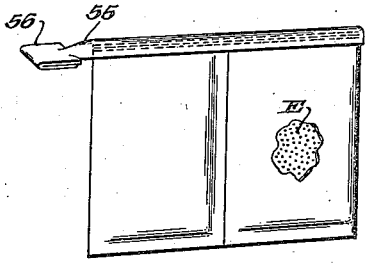
FIG.3.  FIG.4.
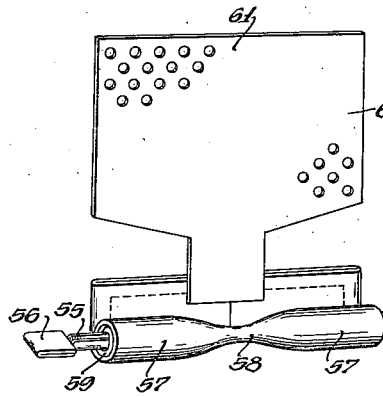 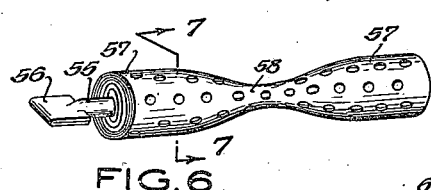
FIG.5.  FIG.7.  FIG.9.
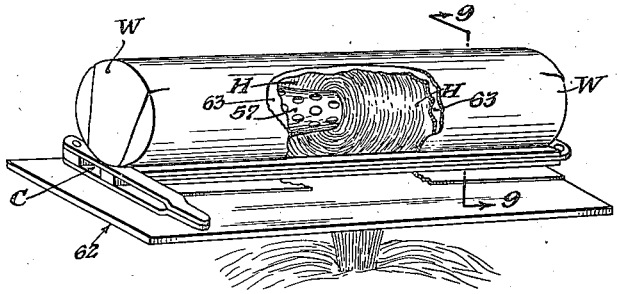 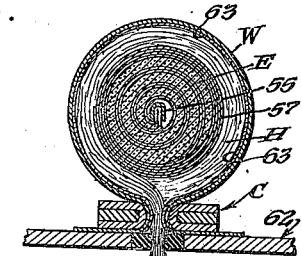
FIG.8.  FIG.10.
INVENTOR
Emile J. Yven
BY
ATTORNEY

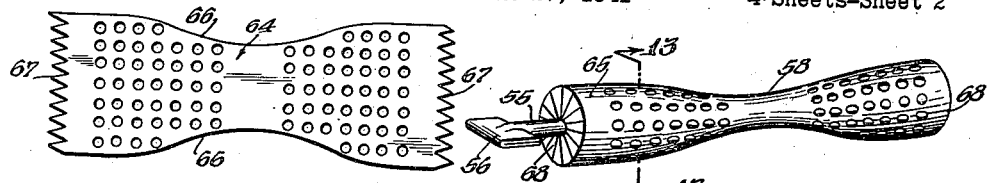
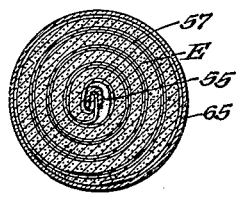
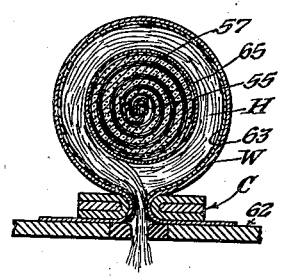
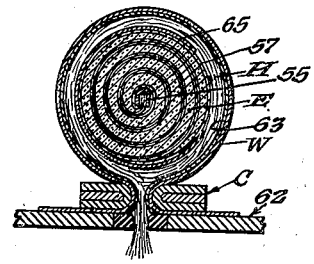
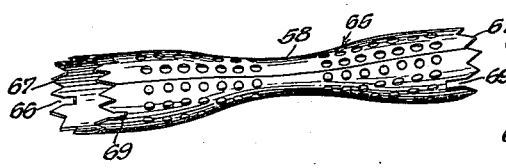
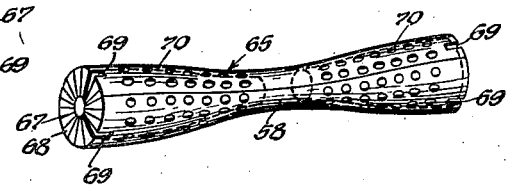
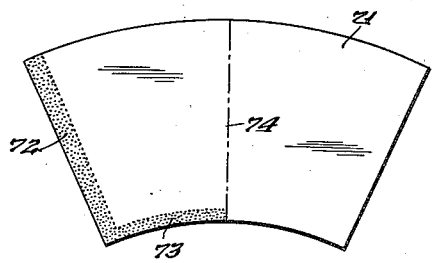
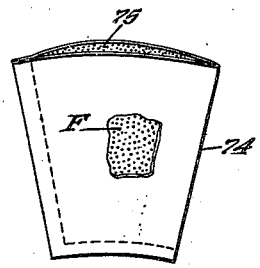
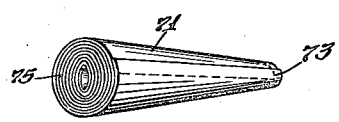

Nov. 11, 1941.  E. J. YVEN  2,262,081
HAIR WAVING APPARATUS AND METHOD OF MAKING AND USING THE SAME
Filed Jan. 27, 1941  4 Sheets-Sheet 3

INVENTOR.
Emile J. Yven
BY
ATTORNEY.

Nov. 11, 1941.   E. J. YVEN   2,262,081
HAIR WAVING APPARATUS AND METHOD OF MAKING AND USING THE SAME
Filed Jan. 27, 1941   4 Sheets-Sheet 4

INVENTOR.
Emile J. Yven
BY
ATTORNEY.

Patented Nov. 11, 1941

2,262,081

UNITED STATES PATENT OFFICE 2,262,081

HAIR WAVING APPARATUS AND METHOD OF MAKING AND USING THE SAME

Emile J. Yven, Jackson Heights, N. Y., assignor to Clairol Incorporated, Stamford, Conn., a corporation of Connecticut Application January 27, 1941, Serial No. 376,073

27 Claims. (Cl. 132—33)

This invention relates to methods and apparatus for permanent hair waving.

Up to the present time, in permanent hair waving methods and apparatus, be they of the Croquignole or Spiral systems, strands of hair have been tightly wound respectively from the tip towards the scalp or vice versa, in flat or spiral coils about mandrels of fixed contour and wetted with a hair treating lotion, and enclosed within an envelope or chamber and subjected to heat developed internally or externally of the mandrel within such envelope or chamber, the shaping of the hair being effectuated through the softening thereof by the development of heat and the reaction thereon of the treating lotion at elevated temperatures, and the subsequent hardening of the thus treated hair on cooling. In such methods the tightly wound hair, by virtue of the action of heat and the waving lotion at elevated temperatures, becomes soft or plastic and stretches, independently of and out of conformity with the mandrel, with the result that the circular or spiral coil formation in which the hair strands are wound, becomes distorted and spaced away from the mandrel upon which they are wound, and upon hardening during the cooling step, such coils do not return to the original circular or spiral contour as wound, such effect being developed whether the heat is applied interiorly or exteriorly of the wound coils.

As one feature of the present invention, I overcome the defects inherent in the prior art methods of waving hair by positively stretching and simultaneously maintaining under tension the wound hair throughout the softening stage and thereafter the hardening stage thereof; so that in accordance with my invention, the treated hair assumes a desired, predetermined spiral or circular coil contour when hardened by cooling, or otherwise.

In carrying out the present invention to impart a so-called permanent wave to a strand of hair, the strand is wound in circular or spiral coil formation about a mandrel designed to expand during the hair softening treatment.

In my preferred practice, the strand is wound about a mandrel charged with exothermic material which, when the exothermic material is activated to generate heat, expands peripherally by an irreversible reaction to stretch the wound strand of hair as it is being softened, the hair being thus maintained under tension throughout the softening stage and thereafter the hardening stage, which may be effectuated by cooling or otherwise.

The novel, preferred mandrel of my invention may be readily assembled of relatively inexpensive materials at such low cost that it may be discarded after but a single use.

Other advantages of my mandrel as applied for the waving of hair will be apparent from the following detailed description of several illustrative embodiments thereof in accordance with my invention, illustrated in the drawings and of their manner of use.

Referring to the drawings:

Figures 1 to 6 illustrate the elements incorporated and the steps applied in forming a mandrel in accordance with one embodiment of my invention.

Figure 7 is an end elevation in section taken along lines 7—7 of Figure 6.

Figure 8 is a perspective view partly cut out showing the assembly incorporating the mandrel made in accordance with the embodiment of Figures 1 to 5.

Figures 9 and 10 are end elevations in section taken along lines 9—9 and 10—10 of Figure 8 before and after the exothermic reaction takes place.

Figures 11 and 12 illustrate the elements incorporated and the steps applied in accordance with another embodiment of my invention.

Figure 13 is an end elevation in section taken along lines 13—13 of Figure 12.

Figures 14 and 15 are end elevations in section showing the relative positions of the elements of the mandrel of the embodiment of Figure 12 in an assembly of the character shown in Figure 8, before and after the exothermic reaction.

Figures 16 and 17 illustrate the elements incorporated and the steps applied in forming a mandrel in accordance with a still further embodiment of my invention.

Figures 18, 19 and 20 illustrate the elements incorporated and steps applied in forming one embodiment of a core for the mandrel of Figure 17.

Figure 21:
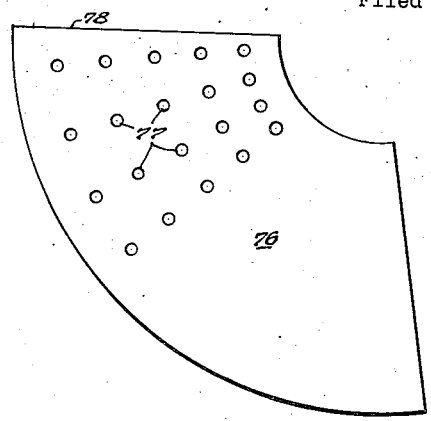
Figure 22:
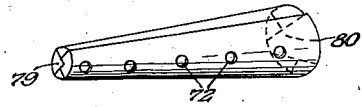

Figures 21 and 22 illustrate the elements incorporated and the steps applied in forming another embodiment of a core for the mandrel of Figure 18.

Figure 23:
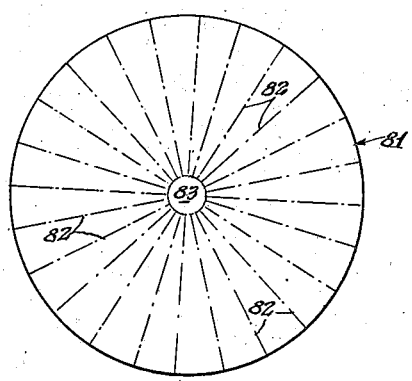
Figure 24:
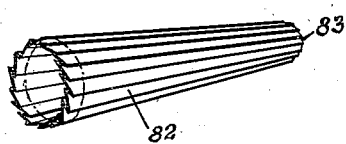

Figures 23 and 24 illustrate the elements incorporated and the steps applied in forming a still further embodiment of a core for the mandrel of Figure 17.

Figure 25:
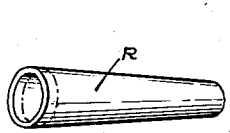

Figure 25 illustrates the elements incorporated and the steps applied in forming still another embodiment of a core for the mandrel of Figure 17.

Figure 26:
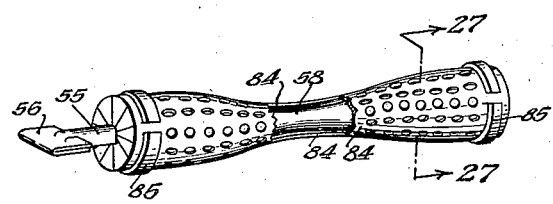

Figure 26 is a perspective view of a still further embodiment of an expansible mandrel applied in my invention.

Figure 27:
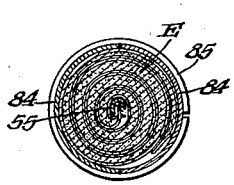
Figure 28:
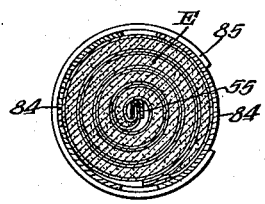

Figures 27 and 28 are end elevations in section showing the relative positions of the elements of the mandrel in Figure 26 before and after the exothermic reaction.

Figure 29:
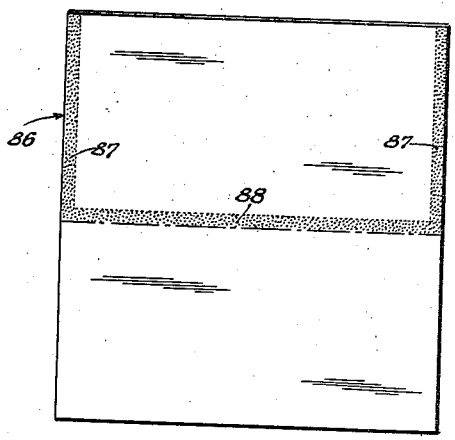
Figure 30:
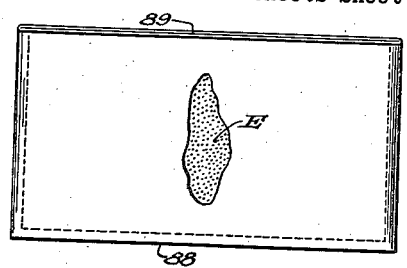
Figure 31:
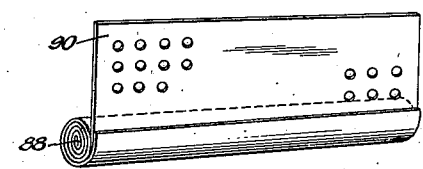

Figures 29 to 31 illustrate the elements incorporated and the steps applied in forming a mandrel in accordance with an embodiment of my invention applicable for Spiral permanent waving.

Figure 32:
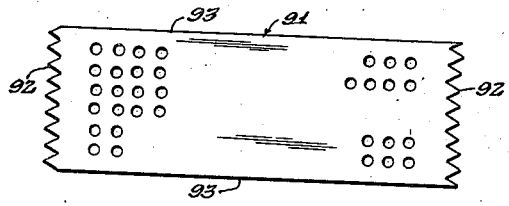
Figure 33:
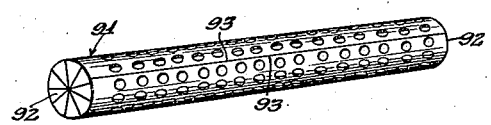

Figures 32 and 33 illustrate the elements incorporated and the steps applied in accordance with another embodiment of my invention for use in Spiral permanent waving.

Figure 34:
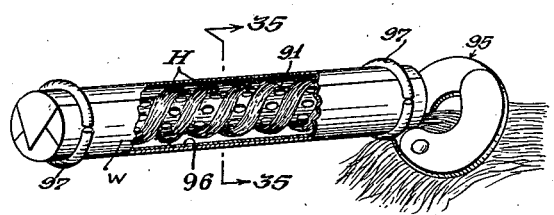

Figure 34 is a perspective view partly cut out of the assembly incorporating the mandrel made in accordance with the embodiment of Figure 33.

Figure 36:
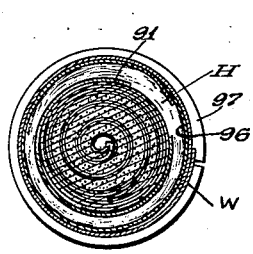
Figure 35:
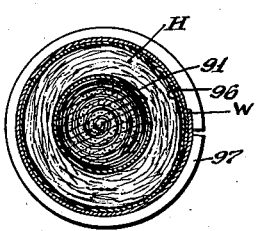

Figures 35 and 36 are taken along lines 35—35 and 36—36 of Figure 34 before and after the exothermic reaction takes place.

In Figures 1 to 10 of the drawings there is disclosed one of the preferred embodiments of a Croquignole structural assembly adapted for carrying out my method of permanent hair waving, the respective figures of such group serving to progressively illustrate the structural and operative functions involved.

In constructing the envelope mandrel applied in this embodiment of my invention, I employ a rectangular blank 50 of preferably porous paper relatively flexible when wetted and, as shown in Figure 1, one face thereof carries adhesive at the edges 51—51, along the short ends and at the spaced edge portions 52—52 leading for a short distance inwardly along one of the longer ends.

As shown in Figure 2, I bend the blank inwardly along spaced vertical fold lines 53—53 with the edges of the short ends thereof being positioned in abutting relationship, so that as the contracting surfaces of the blank are joined through moistening and pressure at the "adhesive" areas, an envelope is formed having two pockets 54—54 open only at the top, as at 55. The respective pockets 54—54 have a width equal to the distance between the fold lines 53—53, which form the extreme ends thereof and the inner edge of the adhesive zones; the pockets being laterally spaced one from the other for a distance equal to the additive width of the adjoining adhesive areas defined along edges 51—51.

Into each of the respective pockets 54—54 of the envelope there is applied a measured charge of exothermic material E, which upon activation with liquid simultaneously develops heat and expands as the reaction end product is being formed, and may, for example, be of the character shown in the patent to Goldfarb and Michaels, No. 2,173,683. As shown in Figures 3 and 4, the respective pockets 54—54 are sealed at their open ends by crimping thereon a U-shaped sealing bar 55 preferably formed of rigid material such as sheet metal, said sealing element having at one end a winding key 56.

Referring to Figures 4, 5 and 6, the blank is spirally rolled about the sealing element 55 as an axis forming thereby two spaced substantially conical coiled units 57—57, each charged with exothermic material E, the opposing apices of which lead from a constricted substantially cylindrical uncharged section 58 defined in rolling by the adhering edges of the pockets; the conical units 57—57 being contoured as to provide substantially cylindrical body portions adjacent the bases or ends 59—59. As shown in Figure 5, when the spiral winding of the charged envelope about the sealing element 55 as an axis is nearly completed a porous perforated sealing closure sheet 60 is inserted between the adjacent concentric cores, and the winding completed to provide a completely wrapped mandrel, shown in perspective in Figure 6 and in cross-section in Figure 7, the edge 61 of the sheet being preferably provided with a water soluble adhesive serving to seal the coiled mandrel along its length, although if desired the closure sheet 60 may be of greater length than the charged envelope being rolled and sealing of the coiled mandrel accomplished without adhesive by bending the edges of the sheet over the bases or ends 59—59 of the formed mandrel; such sealing being a temporary expedient used only to prevent uncoiling of the mandrel prior to its use in the process and does not prevent or impede the expansion of the mandrel in the operative steps of the process.

In Figures 8, 9 and 10 are shown respectively the operative assembly of the embodiment of Figures 1 to 7 as applied for permanent hair waving and sections therethrough defining the operative functions carried out thereby.

In preparing the assembly shown in Figure 8, I wet the mandrel of Figure 6 by dipping the same in a solution adapted on passing through the porous walls of the envelope to activate the exothermic material contained in the pockets 54—54; the solution at the same time serving to dissolve any adhesive used to seal the closure sheet; thereafter, I wind a strand of hair from the ends thereof towards the scalp after having first inserted a protector 62 adjacent the scalp; thereafter I apply a hair waving lotion to the coil of hair H wound on a mandrel, if such has not been previously applied; thereafter I apply circumferentially of the wound coil of hair on the mandrel a moistened absorbent pad 63, and envelop all of the same as assembly above the protector in a water-proof wrapper W, the free ends of which are gripped by clamp C to form a substantially fully enclosed assembly, a detailed enlarged section of which is shown in Figure 9. By the time the steps to form the assembly aforesaid have been completed, the exothermic material in the pockets 54—54 has commenced to develop heat through chemical reaction incited by the activator and as the reaction progresses, the exothermic material expands simultaneously as it further develops heat. The heat thus developed by the exothermic reaction heats and vaporizes the hair waving lotion applied to the hair and present in the absorbent pad 63, thus providing for the hair softening treatment. Upon the expansion of the exothermic material, the now wetted flexible walls of the mandrel enclosing the same are displaced and the mandrel, by virtue of the spiral coil formation thereof expands peripherally and outwardly and substantially evenly along its entire length except that portion thereof defined by the central constricted zone 58, in which no exothermic material is present; with the result that the coil of hair wound during the period of softening treatment is simultaneously peripherally stretched all along its length. The stretched hair is maintained under tension during the entire heat developing exothermic reaction and during the hair hardening period as the mandrel is cooled, for the expansion reaction of the exothermic material being chemically non-reversible, no change in contour of the expanded mandrel or the pressure exerted thereby is developed, even on cooling.

Since the activating solution for the exothermic material is preferably a dilute ammonium compound, any excess thereof not required in the heat developing chemical reaction of the exothermic material becomes vaporized and such vapor as developed acts in aid of the expanding exothermic material, in expanding wetted flexible walls of the envelope winding forming the mandrel coils; and when sufficient pressure is built up during such reaction, the vapor passes through the pores of the envelope walls and into contact with the hair being treated, and at that time functions in aid of the then heated and vaporized hair treating lotion on the hair and in the absorbent pad 63 to soften the coiled hair.

Since the hair treated in accordance with this embodiment of my invention is subjected to the effect of heat, and heated or vaporized permanent waving lotion, all of which cause softening of the fibres of the hair, and, since while being so softened, upon being stretched and maintained under tension by the expansion of the spirally wound mandrel, the hair assumes a predetermined curled conformation defined by the substantially circular and regular periphery of the mandrel and such conformation is maintained during the hardening and setting stage, since the mandrel on which it is wound is expanded by a non-reversible chemical reaction, imparted thereto by the expanded mandrel.

As to the portion of the hair strand wound adjacent the constricted zone 58, the same being the end of the strand and the most brittle portion thereof, will be subjected to substantially only the radiated heat developed in the mandrel and the vaporized hair waving solution and vapor developed within the mandrel, but the stretching and tensioning thereof will be considerably less than that wound relatively flexible portion of the strand around the charge containing zones of the mandrel.

A comparison of the sectional view of Figure 10 with that of Figure 9 discloses the expansion effects described in the operative functions above outlined.

In the arrangement shown in Figures 11 to 15, there is disclosed an embodiment incorporating the spirally coiled mandrel made in accordance with the disclosure of Figures 1 to 6, wherein the mandrel is enclosed within a thin metallic shell 65 of Figure 12 defining opposing conical receptacles formed by rolling the perforated blank 64 of Figure 11; the longitudinal edges 66 of the metal blank 64 being brought into substantial abutment to define the substantially longitudinal slit along the shell 65 from end to end. The vertical edges of the blank 64 are serrated as at 67 to provide radial segments which when bent over form end closures 68—68 for the shell 65 enclosing the coiled mandrel of Figure 6, the winding key 55 of which extends through one of the end closures 68.

With reference to Figures 13 to 15, disclosing the operative steps of the embodiment involved are identical to those specified with respect to Figures 7 to 10, except that by use of the thin metal shell 65 as the enclosure for the spirally wound exothermic material carrying envelope of Figure 6, the following advantages are attained. Since the shell defining the mandrel closure is metallic, the same provides, through its conductivity characteristics, a more even distribution of heat developed in the envelope throughout its length, and as exothermic material therein contained expands during the progress of the heat developing reaction, the shell under the effect of the heat of reaction and the pressure of the expanding coiled envelope upon displacement develops a more even peripheral expansion for stretching and maintaining under tension the coiled hair wound thereon. Since the shell is both thin and resilient and the end products of the non-reversible exothermic reaction within the coiled envelope walls are relatively firm, there is no effective contraction of the shell during the cooling period which would reduce the tension imparted to the coiled hair stretched by the expansion of the mandrel and particularly the envelope and shell thereof.

Referring to Figures 16 to 26, further modifications are shown with reference to the mandrel construction for Croquignole permanent waving assemblies wherein each mandrel comprises an expansible shell carrying at opposite ends thereof expansible envelopes containing exothermic material.

In Figures 16 and 17 are shown respectively the shell 65 rolled from a flat blank 64 and having along its serrated edges 67 slits 69 serving as gripping surfaces for a winder and the completed mandrel containing at opposite ends two substantially conical expansible envelopes 70—70, the apices of which face each other and are spaced by an amount equal to the length of the constricted central zone 58, the ends of which are sealed in by the bent-in serrations 67.

Referring to Figures 18 to 20, one type of conical envelope may be formed by shaping a porous paper blank 71 in the form of a quarter circular segment applying adhesive along radius 72 and part of the smaller arcuate edge 73 and bending along fold lines 74 to form the envelope of Figure 19, after filling the envelope with exothermic material E up to a point near the top of the open end 75 thereof and sealing the same by bending or crimping, the envelope is rolled about the end 74 defined by the fold line as an axis to form the spirally wound envelope shown in Figure 20.

Two such envelopes may be inserted, as shown in Figure 17, in the opposing conical receptacles of the shell 65, and sealed therein by folding over the serrated edges 67 as disclosed, the apices of the respective conical exothermic rolled envelopes being spaced from each other at the zone defined by the constricted cylindrical formation 58 of the shell.

As shown in Figures 21 and 22, I may form conical envelopes for containing the charge of exothermic material E by rolling a porous paper blank 76 cut in quarter circular segments, and having perforations 77 at one segment thereof, about one of its radius ends 78, as an axis to form a hollow receptacle shown in Figure 22, the edge of the rolled blank being bent inwardly to form a sealed apex 79, and after the thus formed hollow conical receptacle is filled with a requisite charge of exothermic material E, the end defining the base 80 is sealed by bending in the edges thereof. Two such conical envelopes are inserted within the opposing conical receptacles of the shell in a manner that is disclosed in Figure 17.

As shown in Figures 23 and 24, I may form the conical envelope by radially creasing a circular blank 81 of porous material along lines 82 from a central zone 83 to the outer periphery, thereafter folding the blank inwardly towards the central zone as an apex to form a substantially conical envelope, shown in Figure 24, and after charging with the requisite amount of exothermic material, bending the edges of the blank inwardly as at the periphery thereof to form a base seal. These conical envelopes are disposed in the conical receptacles of the shell, as shown in Figure 17.

Instead of rolling or folding a porous paper blank of respectively segmental or circular shape into a hollow conical form, as shown in Figures 21 to 24, I may, as shown in Figure 25, form such receptacle R by molding paper pulp particles into a hollow conical shell of porous wall conformation capable of expansion upon wetting and under pressure, the apex being integral and the open ended base being sealed by bending in the edge of the shell after charging with exothermic material.

With reference to the operative functions of an assembly incorporating conical mandrels in a shell formed as shown in Figures 16 and 17, the coiled conical mandrels of Figures 18 to 20, upon the development of the reaction of the exothermic charge upon application of the activator, expand concentrically at the coils thereof and impart a displacement causing peripheral expansion of the metallic shell containing the same in accordance with the description heretofore outlined, with relation to Figures 8 to 10 and 13 to 15, while with respect to the hollow conical mandrels, the formation of which is disclosed in the embodiments respectively of Figures 21 and 22 and 26, on the one hand, the exothermic charge upon reaction expands against the walls of the envelope, which walls being porous and resilient when wetted are displaced thereby, resulting in a peripheral displacement of the enclosing shell of Figure 17, in conjunction with the expansion of the shell upon development of heat in the exothermic charge and on the other hand, with respect to the envelope of Figures 23 and 24, as the exothermic material reacts and expands during the formation of the end product, the overlapping folds of the shell are spread, and as a result of such spreading displace the shell of Figure 17 in which they are enclosed.

In the embodiment shown in Figures 26 to 28 a modified embodiment of the shell is disclosed, wherein the same may be formed of two half section 84—84, gripped at opposite ends by split rings 85—85 to form shell enclosure having conical receptacles or pockets spaced by constricted cylindrical zone 58 in which are carried envelopes of the character shown in Figures 6, 20, 22, 24 or 25. Upon carrying out the exothermic reaction in a Croquignole waving assembly of the character heretofore described, shown in Figure 26, both the split rings 85—85 and the split shell segments 84—84 expand uniformly, except that as shown in Figure 28, in conjunction with the peripheral expansion, there are longitudinal separations along the diametrically opposite abutting lines of the respective shell segments.

Referring to Figures 29 to 34, there is disclosed a further embodiment of a mandrel construction in accordance with my invention, for application to Spiral winding. In this embodiment the envelope is formed from a substantially square porous paper blank 86 carrying adhesive along edge portion 87—87 and alongside central fold line 88. Upon bending the blank 86 along fold line 88 and sealing the same along the adhesive areas, a rectangular envelope open at edge 89 is formed.

As shown in Figures 30 and 31, upon charging the envelope with a predetermined amount of exothermic material E and sealing the open end 89 thereof as by bending over and crimping, the envelope is rolled or wound about fold line 88 as an axis to form a coiled envelope; there being insertible between adjacent concentric coils thereof prior to the completion of winding, a porous perforated sealing closure sheet 90, the edge of the closure sheet carrying the water soluble adhesive for sealing the coiled mandrel along its length as shown, or as an alternative, the sheet may be of such length as to provide edges extending beyond the ends of the coiled envelope which projecting edges when bent over form both an end and longitudinal seal for the mandrel.

Referring to Figures 32 and 33, a rectangular blank 91 of thin metal having serrated edges 92 at its vertical ends and perforated throughout its area, is rolled about the spirally coiled envelope of Figure 33, to form an enclosure shell therefor; the longitudinal edges 93—93 of the blank 91 being in substantial abutting relationship to define the shell enclosure while the serrated edges 92 are bent inwardly to form an end seal.

Referring to Figures 34 to 36 in carrying out the Spiral permanent waving process with the mandrel described in the above embodiments, reference will be had to the mandrel of Figure 33, although the mandrel of Figure 31 may be similarly applied. First, the mandrel is dipped in a solution for activating the exothermic material and a coil of hair is wound about the mandrel from the scalp towards the free ends, as shown in Figure 34, the coiled hair H being hooked or tied respectively adjacent the scalp and the free ends thereof, as in normal Spiral waving practice, hair waving lotion being applied to the hair before or after the winding thereof in spiral form about the mandrel. A protector 95 disposed adjacent the scalp to enclose the strand of hair being treated and an absorbent pad 96 superimposed by a water-proof wrapper 96R are applied to enclose the mandrel carrying the wound hair, the wrapper being clasped and sealed adjacent its opposite ends by elastic or strings 97—97.

The reaction involved is substantially identical with that described heretofore in relation to the Croquignole process insofar as the stretching of the hair and the maintenance of the same under tension, by virtue of the expansion of the mandrel developed simultaneously with the development of heat in the exothermic reaction while the hair undergoes the softening treatment effectuated under heat, except that in this instance the expansion of the mandrel is equal throughout the length of the mandrel, for substantially all of the hair coiled about the mandrel may be safely subjected to the softening and stretching effect involved, the brittle free ends of the hair not being treated in this process. The operative functions involved in the reaction are disclosed in detail in the sectional views of Figures 35 and 36, which illustrate the conditions within the assembly before and after the exothermic reaction.

Although in all the embodiments herein shown the mandrel is in the form of an envelope or a series of spaced envelopes carrying charges of exothermic material in powder form, it is within the province of this invention to apply the exothermic material in the form of a coating for, or as an impregnating material in, a porous or absorbent paper or like material which thereafter may be rolled in coiled form and applied directly by winding thereon the strand of hair to be treated, or disposing the same within a metallic shell about which the strand of hair is wound, to serve as a core capable of expansion as a mandrel when used directly or for displacing the shell in which it is carried, so that the latter serving as a mandrel is by it peripherally expanded, in accordance with and for the purpose of those embodiments heretofore described. Commercially, I prefer to make this expansible mandrel or mandrel core element as follows: I impregnate an absorbent paper or like sheet with calomel by soaking the same in a solution of mercurous nitrate or other soluble mercurous salt and then dip or pass the paper when substantially dry into a solution of sodium chloride or other reagent containing an ion which precipitates mercurous mercury, as for example, a bromide sulphate carbonate or the like, among the inorganic salts, or a citrate tartrate or benzoate among the organic salts, the thus impregnated absorbent paper or like material carrying a precipitated mercurous mercury salt is then cut into strips of suitable size, backed by a foil of aluminum which may be perforated or not as desired, and the thus laminated sheets may be rolled into any desired shape in accordance with the disclosures of Figures 6, 20, 22, 24 and 30.

As indicated, by applying substantially porous paper or like material to form the envelope enclosing medium or carrier for the charge of exothermic material, I am able to produce an expansible mandrel adapted for use directly or in connection with an enclosing, metallic shell in both Croquignole and Spiral winding, which not only is of light weight, formed of inexpensive materials, and readily assembled, but the same has the added advantage that it provides for a sanitary permanent hair waving process in that the mandrel, by virtue of the aforesaid qualities, is applicable as a single use unit.

By the expression intrathermal exothermic unit, as applied in this application and in reference to hair waving apparatus and methods referred to herein, is meant an interior heating device, the heat effect of which is developed by exothermic material.

This application is a continuation-in-part of my copending application, Serial No. 280,903, filed June 24, 1939, and entitled "Hair waving apparatus and methods of making and using the same."

It is obvious that various changes and modifications may be made to the details of construction without departing from the general spirit of the invention as set forth in the appended claims.

I claim:

1. An intrathermal exothermic mandrel about which hair is wound for stretching and waving, comprising an elongated member enclosing exothermic material said member comprising a shell having enlarged end portions connected by a constricted body portion, within which such exothermic material is so distributed as to be present in preponderance at the ends thereof.

2. An expansible mandrel about which hair is wound for stretching and waving, comprising an elongated pliable member enclosing exothermic material said member having enlarged end portions connected by a constricted body portion and within which such exothermic material is so distributed as to be present in preponderance at the ends thereof, said member being adapted to expand when the exothermic material therein undergoes reaction.

3. An expansible mandrel about which hair is wound for stretching and waving, comprising a pliable carrier enclosing exothermic material said carrier having enlarged end portions connected by a constricted body portion and within which the exothermic material is so distributed as to be present in preponderance at the ends thereof, and an expansible metal cover extending along and enveloping the carrier, said carrier and cover being adapted to expand when the exothermic material undergoes reaction.

4. An expansible mandrel about which hair is wound for stretching and waving, comprising a pliable carrier in which exothermic material is distributed, said carrier being formed of an envelope spirally wound about a longitudinal edge thereof as an axis, and within which the exothermic material is distributed along its length before, and remaining after winding, so as to be present in preponderance at the ends thereof, said carrier being adapted to expand when the exothermic material undergoes reaction.

5. An expansible mandrel about which hair is wound for stretching and waving, comprising a pliable carrier in which exothermic material is distributed, said carrier being formed of an envelope spirally wound about a longitudinal edge thereof as an axis, and within which the exothermic material is distributed along its length before, and remaining after winding, so as to be present in preponderance at the ends thereof, and an expansible metal cover extending along and enveloping the spirally wound carrier, said carrier and cover being adapted to expand when the exothermic material undergoes reaction.

6. An expansible mandrel about which hair is wound for stretching and waving, comprising an expansible porous core in the form of a container enclosing therein exothermic material which gives off heat and steam when wetted, and said core having enlarged end portions connected by a constricted body portion wherein the exothermic material is so distributed as to be near the ends of the core, and a perforated expansible metal covering enclosing the core, said core and cover being adapted to expand when the exothermic material undergoes reaction.

7. An expansible hair waving mandrel about which hair is adapted to be wound, comprising an expansible, tubular metal cover having a constricted central portion and enlarged lateral portions leading towards said central portion, and a charge of exothermic material within each lateral portion, said exothermic material being enclosed by a powder tight porous wrapper, said wrapper and said cover being adapted to expand when the exothermic material undergoes reaction.

8. An expansible hair waving mandrel about which hair is adapted to be wound, comprising an expansible, tubular metal cover having a constricted central portion and substantially conical-shaped wing portions tapering towards said central portion, a charge of exothermic material lying within each wing portion with the opposed end portions thereof spaced from each other beneath said constricted portion, and a powder tight porous wrapper about each charge, said wrapper and said cover being adapted to expand when the exothermic material undergoes reaction.

9. An expansible hair waving mandrel about which hair is adapted to be wound, comprising an expansible, tubular perforated metal cover having a constricted central portion and substantially conical-shaped wing portions tapering towards said central portion, a charge of exothermic material lying within and substantially filling each wing portion with the opposed end portions thereof spaced from each other beneath said constricted portion, and a spirally wound powder tight porous envelope for carrying each charge within its windings, said envelope and said cover being adapted to expand when the exothermic material undergoes reaction.

10. An expansible hair waving mandrel about which hair is adapted to be wound, comprising an expansible, tubular shell having a constricted central portion and substantially conical-shaped wing portions tapering towards said central portion, a charge of exothermic material lying within and substantially filling each wing portion with the opposed end portions thereof spaced from each other beneath said constricted portion, said shell being adapted to expand when the exothermic material undergoes reaction.

11. An intrathermal exothermic hair waving mandrel, comprising two spirally wound paper containers filled with exothermic material and spaced from one another lengthwise of the mandrel to provide a central region with no heating material.

12. An intrathermal exothermic hair waving mandrel such as claimed in claim 11, having a porous paper wrapper about the wound containers.

13. An intrathermal exothermic hair waving mandrel such as claimed in claim 11, having an expansible metal covering about the wound containers.

14. An intrathermal exothermic unit for use in hair waving mandrels, comprising a powder tight, porous container enclosing exothermic heating material, the container being wound into a tight spiral adapted to expand when the heating material undergoes reaction.

15. An intrathermal exothermic unit for use in hair waving mandrels, comprising two powder tight, porous containers enclosing exothermic heating material and spaced from one another, the containers being wound into tight spiral each adapted to expand when the heating material undergoes reaction.

16. An intrathermal exothermic unit for use in hair waving mandrels, comprising a powder tight porous container enclosing exothermic heating material, the container being wound into a tight spiral adapted to expand when the heating material undergoes reaction, and a stretchable porous paper wrapper about the spirally wound container.

17. An intrathermal exothermic unit for use in hair waving mandrels, comprising a powder tight porous container enclosing exothermic heating material, the container being wound into a tight spiral adapted to expand when the heating material undergoes reaction, a stretchable porous paper wrapper about the spirally wound container, and a thin walled expansible metal covering about the wrapper.

18. An intrathermal exothermic hair waving mandrel, comprising a spirally wound, powder tight, porous container filled with exothermic material.

19. An intrathermal exothermic hair waving mandrel, comprising a spirally wound, powder tight, porous container filled with exothermic material and having an axially disposed container closing device provided with an exposed winding key.

20. The method of making the core for a hair waving mandrel which comprises forming a sheet of paper into two spaced containers, filling the containers with exothermic heating material, closing the containers, and winding them into two spirals about a common axis.

21. The method of making the core for a hair waving mandrel which comprises forming a sheet of paper into two spaced containers, filling the containers with exothermic heating material, closing the containers, winding them into two spirals about a common axis, and winding a wrapper about the wound containers.

22. The method of making the core for a hair waving mandrel which comprises forming a sheet of paper into two spaced containers, filling the containers with exothermic heating material, closing the containers, winding them into two spirals about a common axis, winding a wrapper about the wound containers, and enclosing the same in an expansible metal covering.

23. An expansible hair waving mandrel about which hair is adapted to be wound, comprising an expansible, tubular perforated metal cover having a constricted central portion and substantially conical-shaped wing portions tapering towards said central portion, a substantially conical-shaped charge of exothermic material insertible within and substantially filling each wing portion with the tapered end portions opposed and spaced from each other beneath the said constricted portion, and a powder tight porous envelope about each charge, said envelope and said cover being adapted to expand when the exothermic material undergoes reaction.

24. An expansible hair waving mandrel about which hair is adapted to be wound, comprising an expansible, tubular perforated metal cover having a constricted central portion and substantially conical-shaped wing portions tapering towards said central portion, a substantially conical-shaped charge of exothermic material insertible within and substantially filling each wing portion with the tapered end portions opposed and spaced from each other beneath the said constricted portion, and a spirally wound powder tight porous envelope for carrying each charge within its windings, said envelope and said cover being adapted to expand when the exothermic material undergoes reaction.

25. In a hair curler, a coiled bibulous paper former having cylindrical ends and integral conical connections therebetween, said connections gradually diminishing in cross-sectional area towards the center, chemical substances confined in the coils of said former adapted to produce heat upon the application of moisture, and means at the end edges of said former to retain said substances therein.

26. In a hair curler, a coiled bibulous paper former having cylindrical ends and integral conical connections therebetween, said connections gradually diminishing in cross-sectional area towards the center, chemical substances confined in the coils of said former adapted to produce heat upon the application of moisture, a bibulous paper wrapper disposed over said former, and an envelope enclosing said former and wrapper, said envelope having an absorbent lining and a moisture proof facing.

27. The process of hair curling which consists of clasping a lock of hair at its roots adjacent the scalp, winding the hair upon a former closely against the clasp, moistening the hair and former thereby to produce heat in the former, wrapping the coiled hair and former in a bibulous cover, enclosing the wrapper and contents in a waterproof envelope, and applying a clamp thereover.

EMILE J. YVEN.